Figure 1:
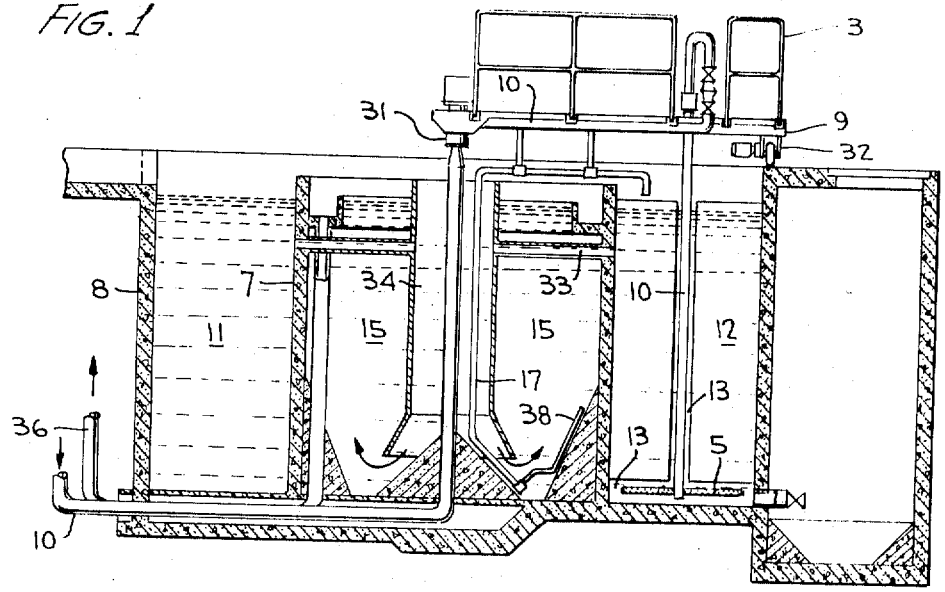

United States Patent

[11] 3,599,794

[72] Inventors August Schreiber
Bahnhofstrasse 45 A, Vinnhorst;
Martin Danjes, Hermannstrasse 3,
Denmold, both of, Germany
[21] Appl. No. 849,098
[22] Filed Aug. 11, 1969
[45] Patented Aug. 17, 1971
[32] Priority Aug. 12, 1968
[33] Germany
[31] P 17 84 469.8

[54] PURIFICATION PLANT FOR AERATION OF SEWAGE
8 Claims, 2 Drawing Figs.

[52] U.S. Cl. .................................................. 210/195,
210/7, 210/221, 210/256, 261/87
[51] Int. Cl. .................................................. C02c 1/12
[50] Field of Search .................................... 210/14, 15,
4—7, 220, 221, 256, 194—197, 528—530; 261/87

[56] References Cited
UNITED STATES PATENTS

| 3,330,413 | 7/1967 | Danjes | 210/15 X |
|---|---|---|---|
| 3,396,102 | 8/1968 | Forrest | 210/15 X |
| 3,415,379 | 12/1968 | Thayer | 210/256 X |
| 3,448,861 | 6/1969 | Berk | 210/14 X |

FOREIGN PATENTS

| 104,361 | 2/1917 | Great Britain | 210/219 |
|---|---|---|---|
| 107,937 | 7/1917 | Great Britain | 210/220 |

Primary Examiner—Michael Rogers
Attorney—Watson, Cole, Grindle & Watson

ABSTRACT: A process and a purification plant for the aeration of sewage in an aeration tank with displaceable aeration means arranged close to the bottom of the tank.

PATENTED AUG 17 1971

3,599,794

INVENTORS,
AUGUST SCHREIBER
MARTIN DANJES

BY Watson, Cole, Grindle & Watson
ATTORNEYS

PURIFICATION PLANT FOR AERATION OF SEWAGE

This invention relates to a process and purification plant for the aeration of sewage in an aeration tank, using displaceable aeration means arranged close to the bottom of the installation.

It is known that the use made of the oxygen in the aeration of sewage or mixtures of sewage and activated sludge is more thorough if the air bubbles are introduced into the flowing water or sewage, see for example, the article "A new development in pressure air aeration" (translation) by A. Pasveer and S. Sweeris, Research Institute for public health engineering T.n.O Working Report, 27th., Nov. 1962, and German Specification No. 1,202,227. According to that article, the air bubbles ascend at diminished velocity and over a larger travel path to the surface and the time of contact of the air bubbles with the water is increased relatively to what happens when air bubbles are introduced from a stationary aerating device into water which is not moving. The air bubbles introduced then ascending along the shortest path, vertically to the water surface and doing so at the ascending velocity of the air bubbles in nonflowing water plus the ascending velocity of the water, is constrainedly adjusted by means of the air bubbles.

The invention proceeds from the fact that more thorough use of oxygen is achieved if a horizontal relative velocity is attained between the air bubbles introduced and the water. The thorough use of the oxygen is then the same, whether the aeration device is displaced horizontally in the water at a predetermined velocity or whether the water flows, at the same velocity, horizontally over a stationary aeration device.

It is an object of the present invention to provide, while making use of this realization, a process and purification plant of the type mentioned at the outset, wherein with regard to the air bubbles introduced, a long travel path is constrainedly imparted and the desired purification effect is attained with the minimum of expenditure. To this end, the invention proposes a process characterized in that the air distributors are, in the case of longitudinal tanks, reciprocated over the tank bottom at a velocity of more than 20 cm./s. and, in the case of annular tanks, displaced in such manner that they rotate continuously and further characterized in that, in the case of annular tanks, the waterflow produced is so braked at at least one point that a rotating circular flow is prevented entirely or for the greater part.

In the case of the process according to the invention, the air distributors have imparted to them rapidly reciprocating movement and, at the same time, air is blown in. Due to the braking of the waterflow, the air bubbles emerging from the air distributors are vigorously deflected from the vertical, so that the air bubbles are required to travel over a relatively long path in the sewage so that in this way ensuring the introduction of oxygen in an economic manner as compared with the prior art. At the same time, sewage-activated sludge mixtures and any deposits which there may be on the tank bottom, continue to be whirled up and held in suspension.

The clarification plant according to the invention for the performance of the process, has an elongated tank and an aeration device displaceably arranged on the longitudinal walls of the tank, and is characterized in that the air distributors extend substantially over the entire tank width. In order to brake or retain the content of the tank, use is made of the end face walls of the elongated tank, except for minor conditions resulting from damming-up effects.

A reciprocating device is, in practice, with regard to operating reliability, more liable to breakdown than is a device which is uniformly displaced, without interruption, in one direction only. Thus, for the performance of the process according to the invention, there is furthermore proposed a purification plan having an annular tank, and an aeration bridge is mounted for rotation about the tank center point, and having air feedpipes secured thereto and air distributors connected to the latter. Further there is arranged in the annular tank at least one radial partition which is formed with recesses for the passage of the air feedpipes and has air distributors extending substantially over the entire tank width. In this case, the radial partitions serve for braking the waterflow.

The aeration bridge is placed into rotational movement either by means of an electric motor or by means of the air emerging from the attached air distributors. Due to the subdivision of the annular aeration tank by means of one or more partitions, a rotary circular movement of the sewage due to the rotary movement of the air distributors is prevented, even at velocities of about 80 cm./s. The recesses formed in the partitions are only sufficiently large as is necessary for unhindered passage of the air distributors and the air feedpipes associated therewith.

It is, however, also possible to provide the recesses with flaps which open and close on passage of the air feedpipes and air distributors, so that throughflow of the water is entirely prevented, the flaps only opening when the air feedpipes and the air distributors travel through the recesses.

It is a further object of the invention to so arrange the feedpipe of the return flow sludge out of the secondary settler, the feedpipe of the untreated water and the position of the partitions so that the purification process takes place in accordance with the known contact stabilization process.

Figure 2:
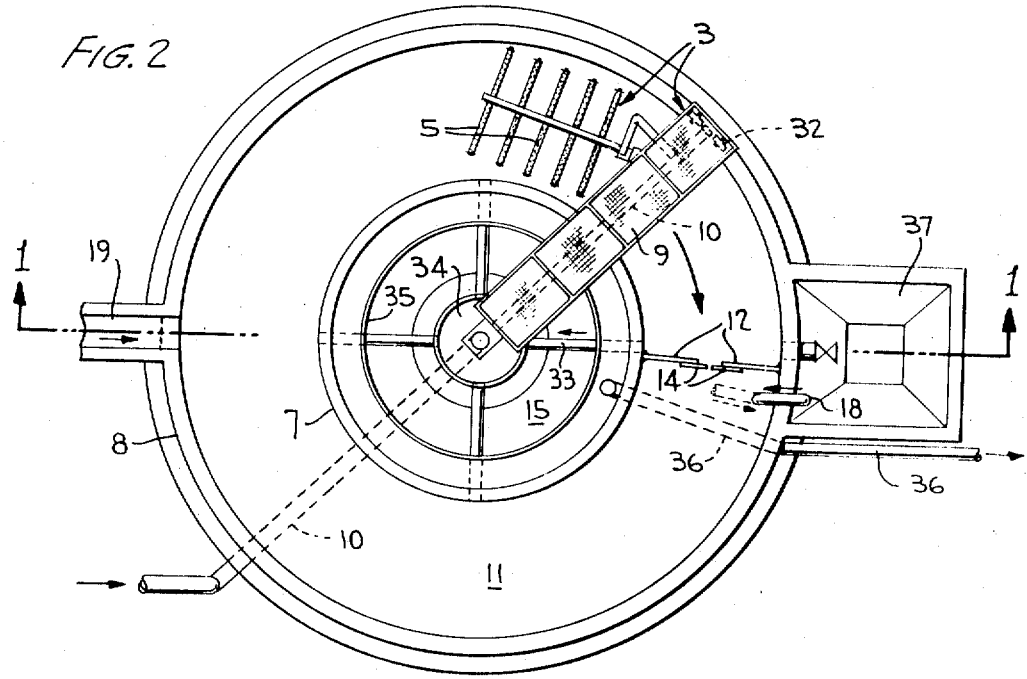

For a better understanding of the invention and to show how it may be carried into effect, the same will now be described by way of example, with reference to the accompanying drawings, in which:

FIG. 1 is a sectional view and taken on line 1-1 of FIG. 2, showing an annular tank of the purification plant operating in accordance with the activated sludge process, and FIG. 2 is a plan view of the annular tank according to FIG. 1.

In the individual figures:
6 designates the tank bottom of the elongated tank 1,
7 designates the inner wall of an annular tank 11,
8 designates the outer wall of the annular tank 11,
9 designates the aeration bridge for the annular tank 11,
10 designates air feedpipes leading to the air distributors 5,
11 designates an aeration tank designed as an annular tank,
12 designates a partition in the annular tank 11,
13 designates recesses (or apertures) in the partition 12,
14 designates flaps at the recesses 13,
15 designates the secondary settler tank,
17 designates the pump in the annular tank 11,
18 designates the conduit for the return flow sludge out of the secondary settler tank 15 into the annular tank 11,
19 designates the feedpipe for untreated sewage feed,
20 designates the feed shaft,
31 designates the central bearing of the aeration bridge 9,
32 designates the supporting travel mechanism of the aeration bridge 9,
33 designates the pipeline for the infeed of activated sludge water mixture out of the annular tank 11 into the secondary settler tank 15, 34 designates the down and calming shaft in the secondary settler tank 15,
35 designates the overfall threshold in the secondary settler tank 15,
36 designates the discharge pipe into the draining ditch or canal,
37 designates the sludge removal shaft,
38 designates the sludge scraper.

An activated sludge installation of annular design operating in accordance with the process of the invention is shown by way of example in FIGS. 1 and 2. This installation comprises a central tank 15, which may be used for secondary settling, for mechanical prepurification or sludge stabilization or oxidation, and an aeration tank designed as an annular tank 11 and surrounding the said central tank. The inner wall between the central tank 15 and the annular tank 11 is designated by reference character 7. A bearing 31 is provided in the center point of the entire installation on which an aeration device 3 is pivotally mounted and consisting of an aeration bridge 9.

From the aeration bridge 9 an air feedpipe 10 extends to the air distributors 5. Extending in the air feedpipe 10 is, furthermore, an electric cable for current feed to the aeration bridge 9. The aeration bridge 9, with the air distributors 5, is driven either by means of a travel mechanism 32, driven by an electric motor and supported on the outer wall 8 of the annular tank 11 or by means of the guide faces (not shown) arranged in uniformly inclined positions over the air distributors 5 according to the U.S. Pat. No. 3,336,016, the said guide faces being secured to the aerating device 3.

Built into the annular tank 11 is a partition 12 for preventing the tank content from passing, on rotation of the air feedpipe 10 with the air distributors 5, into a rotating circular flow. The partition 12 has apertures 13 which are only of sufficient size to insure that the air feedpipe 10 and the air distributors 5 are able to rotate without hindrance in the annular tank 11. As this takes place, it is true that a slight rotational flow will take place through the apertures 13 in the sense of the rotational movement of the aeration device 3, but this does not influence the introduction of nitrogen to any particular extent. However, it is also possible (as can be seen from FIG. 5) to fit flaps 14 over the apertures 13 and which are opened on passage of the air feedpipe 10 and the air distributors 5 and thereafter close again.

In the case of an activated sludge plant having an annular aeration tank 11 according to FIGS. 1 and 2, the sewage to be purified enters through the feed conduit 19, flows into the annular tank 11, is there aerated and freed by the activated sludge from dirt, in particular organic dirt, which is disadvantageous to the operation of the draining canal. It then flows, mixed with activated sludge, through the pipeline 33, into the central downwardly directed and calming shaft 34, and then passes into the secondary settler tank 15 where it rises only sufficiently slowly to ensure that the sludge particles drop to the bottom and the water is fed, with the sludge removed therefrom over the overfall threshold 35 and over the discharge conduit 36 to the drain canal. The sludge deposited within the secondary settler tank 15 is, as shown in FIG. 1, conveyed by means of a sludge scraper 38 secured to the aeration bridge 9 and a pump (for example a mammoth pump 16) into the annular tank 11. The sludge scraper 38 may however, also be driven, by means of reduction gearing, by the aeration bridge 9 at a speed lower in itself.

Arranged at the surrounding wall 8 is a sludge removal shaft 37 by means of which activated sludge developing in the annular tank 11 may be withdrawn.

This installation according to FIGS. 1 and 2 (illustrated by way of example) may, however, also be operated in accordance with the activated sludge purification process of the contact stabilization process, that is, the activated sludge is aerated for a relatively long period of time, then has unpurified sewage fed thereto and, even after a short period of aeration, the mixture of sewage and activated sludge flows into the secondary settler tank. From there, it flows, after sludge has been removed therefrom, into the drain ditch or canal, whereas the deposited sludge from the secondary settler tank is serated for a longer period of time in another tank and is also kept in suspension and only after this has been done, once again aerated together with the untreated sewage to be purified.

This purification process takes place when the infeed 19, the partition 12, the feed means 33 to the secondary settler tank 15 and the means for returning the activated sludge into the annular tank are provided in the manner shown in FIG. 5. With this arrangement, the deposited sludge is conveyed out of the center of the secondary settler tank 15, by means of a stationary conduit 18, in the sense of the direction of rotation of the aeration bridge 3, behind the partition 12, into the annular tank 11 as far as the infeed 19, without unpurified sewage being fed thereto. This sludge is, thereby, aerated within half the aeration space of the annular tank 11 and the infeed 19, this aerated activated sludge is mixed with the sewage to be purified and both are aerated and both flow to a point before the partition 12. The sludge particles very rapidly take up the released and colloidal substances of the unpurified sewage, so that the sewage is able to flow, by means of the secondary settler tank 15, fully biologically purified, through the discharge conduit 36 to the discharge outlet. By means of the apertures 13, the sludge concentration may be kept at a higher level within the aeration chamber, in particular in the reaeration chamber (between the partition 12 and the infeed 19), so that a greater degree of stability and improved purification is achieved than would be achieved if the return flow sludge were to be conveyed out of the secondary settler tank and by means of the pipe 17 secured to the aeration device 3, in such manner as to flow continuously into the annular tank 11.

In this way, it becomes possible to purify sewage satisfactorily and economically, using relatively simple means.

We claim:

1. Sewage plant for the aeration of sewage comprising an annular aeration tank, an aeration bridge mounted rotatably around the center of the tank, driving means for the rotation of the bridge, air feedpipes attached to the bridge at the ends of which air distributors are mounted and located near the bottom of the tank, and at least one radial separating wall in the tank with recesses therein for the passage of the air feedpipes and the distributors upon the rotation of the bridge.

2. Purification plant according to claim 1, in which at least one radial partition is arranged in the annular tank and formed with apertures for the passage of the air feedpipes and air distributors.

3. Purification plant according to claim 1, in which at least one radial partition is arranged in the annular tank and formed with apertures for the passage of the air feedpipes and air distributors and in which apertures are provided with flaps in the partition which open and close on passage of the air feedpipes and air distributors.

4. Purification plant according to claim 1, in which a tank is provided within the annular tank serving for secondary settling or purification or for mechanical prepurification or for sludge oxidation, and in which a sludge scraper is provided extending from the aeration bridge or an air distributor extending from the aeration bridge.

5. Purification plant according to claim 4, in which an airlift pump if provided for conveying the return flow sludge out of the secondary settler tank into the annular tank, the airlift pump being secured to the aeration bridge to rotate therewith.

6. Purification plant according to claim 4, in which a pipe for conveying the return flow sludge out of the secondary settler tank into the annular tank, is arranged to be stationary and rearwardly of the partition relatively to the direction of rotation of the aeration bridge.

7. Purification plant according to claim 1, in which infeed is provided for the nonpurified sewage in a zone provided relative to the direction of rotation of the aeration bridge so that the purification takes place in accordance with the contact stabilization process.

8. Sewage plant according to claim 1, in which the air distributors rotate continuously with a speed of at least 20 cm./per second.